United States Patent [19]

Peltier et al.

[11] 4,084,339

[45] Apr. 18, 1978

[54] ILLUMINATED DISPLAY APPARATUS

[76] Inventors: Raymond Peltier, 11, Square Jasmin, 75016 Paris, France; Jean-Paul Meric, 10, rue du Dr. Roux, 75015 Paris, France

[21] Appl. No.: 699,686

[22] Filed: Jun. 25, 1976

[30] Foreign Application Priority Data

Jun. 26, 1975 France .............................. 75 20087

[51] Int. Cl.2 ........................ G09F 13/00; B06Q 1/00; G03B 21/14

[52] U.S. Cl. ...................................... 40/560; 340/103; 353/97; 40/582; 40/612

[58] Field of Search ......................... 40/130 B, 130 R; 350/150, 6, 7; 353/97; 178/7.6; 340/103; 331/94.5

[56] References Cited

U.S. PATENT DOCUMENTS

| | | | |
|---|---|---|---|
| 2,341,223 | 2/1944 | Lillie | 353/62 |
| 2,380,667 | 7/1945 | Morrison | 40/130 B |
| 3,090,280 | 5/1963 | Winter | 40/130 B |
| 3,161,356 | 12/1964 | Brenner | 40/130 B |
| 3,790,431 | 2/1974 | Tung | 40/130 B |
| 3,802,944 | 4/1974 | Tung | 40/130 B |
| 3,844,635 | 10/1974 | Atkins | 40/130 B |

OTHER PUBLICATIONS

Kennedy, et al., "Laser Display Systems" Instruments & Control Systems—Dec. 1968, pp. 59-63.

Smith, "Laser Beam Deflection Device" IBM Technical Disclosure Bulletin, vol. 8, No. 1, 6/65, p.108.

Knox, et al.; "A T.V. Rate Laser Scanner" RCA Review, vol. 33, Dec. 1972, pp. 623-673.

*Primary Examiner*—Samuel W. Engle

*Assistant Examiner*—Donald P. Walsh

*Attorney, Agent, or Firm*—Browdy and Neimark

[57] ABSTRACT

An illuminated display apparatus includes a laser projector and a retro-reflective screen onto which the beam from the laser projector is projected. A beam deflection device may be disposed between the projector and the screen. The beam deflection device may be associated with a modulator for modulating the intensity of the light beam. A beam spreader and a mask may be substituted for the deflection device and modulator, the shadow of the mask appearing on the screen.

8 Claims, 5 Drawing Figures

ILLUMINATED DISPLAY APPARATUS

BACKGROUND OF THE INVENTION

This invention relates to an illuminated display apparatus which has a particularly useful application to road signalling.

Mobile public notices and road signals at present take the form of portable panels carrying inscriptions which can be uncovered or hidden as required. These devices lack flexibility in their use because the message which they carry are generally fixed. If the message has to be variable, then panels are available on which there are arranged lamps or light-emitting devices, arranged for selective energization by means of electrical devices so as to permit the selective illumination of only those lamps or light-emitting devices corresponding to the letters, numerals or other symbols which make up the desired message. However, these lamps or devices are generally of low brightness, so that their visibility in daylight is mediocre, especially in brilliant sunlight.

SUMMARY OF THE INVENTION

The present invention has for its principal object to overcome the above-mentioned disadvantages and shortcomings.

The foregoing object, as well as others which are to become clear from the text below, is achieved according to the invention by providing an illuminated display apparatus which includes a laser projector and a retro-reflective screen, the screen being operatively positioned to receive the beam emitted by the laser projector.

The laser is known to be a high-intensity monochromatic light source and is highly directional. The yield in photons of such a source is exceptionally good, since all the emitted photons are in the required direction, and are at the required phase and wavelength. It has now been discovered that by combining a laser projector with a retro-reflective screen one obtains a luminous efficiency such that an inscription formed on this screen is visible in daylight, even in strong sunshine, provided that the viewer is within the aperture angle of the reflected luminous beam. This result is due to the fact that the retro-reflective screen preserves the coherence of the beam emitted by the laser and reflects it towards the source with a very high efficiency.

The message may be directly inscribed on the screen, but in the preferred embodiment of the invention the display apparatus includes means interposed between the laser and the screen to act upon the emitted laser beam. This gives more flexibility to the apparatus because any required message can then be projected on to a single screen and the message can be varied very rapidly. Advantageously, the means acting upon the laser beam includes deflection means capable of sweeping the projected beam across at least a part of the screen. Such an arrangement permits the projected message to be remotely controlled, utilizing deflection devices such as mirrors, prisms, acousto-optic devices or any other means capable of being mechanically or electrically controlled for transmitting a signal. If the writing speed is greater than the speed corresponding to the persistence of vision, an observer will not be aware of the movement of the point of incidence of the beam on the screen and, on the contrary, he will get an impression of continuity.

The light beam can be deflected in such a manner as to form the required message directly on the screen, but advantageously the means for acting on the laser beam includes additionally means for modulating the intensity of the light beam. The deflection means then scan the whole of the screen and the modulation (for example, of the "all or nothing" kind) permits the illumination of only the required zones.

In a modification, the means for acting on the laser beam includes means for spreading the beam and a mask, the shadow of which is projected onto the screen. This means for spreading the beam can be of any known, conventional type. The mask represents the message to be conveyed, either in positive or in negative form. Advantageously, the retro-reflective screen is of a conventional type constituted by an assembly of glass balls. It is known that this type of screen is readily available and that its manufacture is relatively easy. Of course, any type of catadioptric member could be used instead.

BRIEF DESCRIPTION OF THE DRAWING

In order that the invention may be better understood, examples of apparatus embodying the invention are to be described with reference to the accompanying drawing, in which.

DETAILED DESCRIPTION OF THE PREFERRED EMBODIMENT

Figure 1:
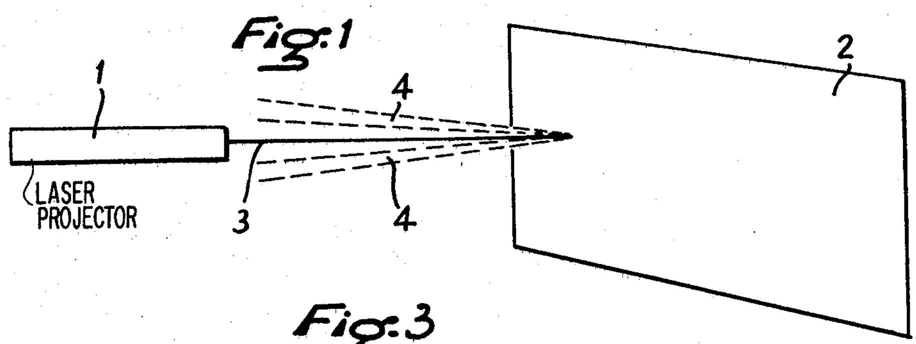
FIG. 1 illustrates the principle behind the invention.

As shown in FIG. 1, a laser projector 1 is positioned opposite a retro-reflective screen 2. The laser projector 1 projects onto the screen 2 a coherent light beam 3 which is reflected in the direction of the incident beam. The screen 2 may not be perfectly retro-reflective and, in this case, there will be a certain angular dispersion but the reflected beam 4 thus dispersed is always centered around the incident beam 3, whatever may be the angle of the incident beam 3 with respect to the screen 2.

Figure 2:
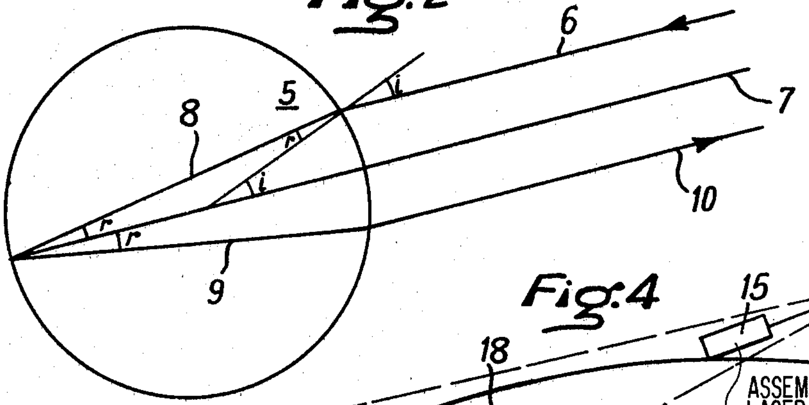
FIG. 2 shows the principle of operation of a retro-reflective screen.

FIG. 2 shows how such a screen 2 (FIG. 1) can be formed. Numerous spherical glass balls, such as the ball 5 of FIG. 2, are sunk into a coating spread over a panel. When an incident light ray 6 reaches the surface of the ball 5 parallel to its incident direction 7, it is refracted at 8 and is then reflected along a path 9. On emerging from the glass ball 5, this ray forms a reflected ray 10, after a further refraction.

It can be shown that if $i = 2r$, the rays 6 and 10 are parallel. As a consequence, if the refractive index for the glass of which the ball is made is about 2, the incident and reflected rays travel in opposite directions. If the refractive index departs from this value, a certain angular dispersion results but the dispersed beam is still centered on the incident ray.

It has been shown that the combination of the two coherent optical devices, the laser projector 1 and the retro-reflective screen 2 enables the provision of a positive or negative luminous inscription of the color of the laser, the brightness of which is greater than that of sunlight. It is thus visible in full sunlight and can therefore be used for road signalling, for notices or for any other form of display.

The invention is not however limited to the use of retro-reflective screens constituted by spherical glass balls. Any screen providing coherent reflection, as opposed to reflection by a perfectly diffusing surface, can be used in a device embodying the present invention. Thus, such a coherent reflection could be obtained by means of very fine lines forming a network or grating or by microscopic prisms formed by a crystal.

Figure 3:
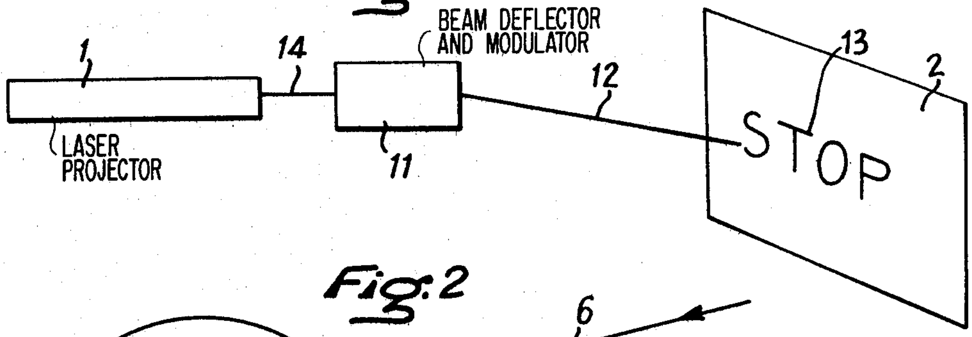
FIG. 3 is a diagrammatic illustration of a first embodiment of an illuminated display apparatus according to the present invention.

FIG. 3 shows how a message can be written with a laser on a screen. A conventional beam deflection system 11, which may include a light modulator to modulate the intensity of a beam 14 received from the laser projector 1, is interposed between the laser projector 1 and the screen 2. The deflection system 11 is arranged to cause the screen 2 to be swept by the light beam 12. The system may be of a number of known types. The beam 12 may either write a message 13, illustrated as the word STOP, directly or it may scan the whole of the screen 2, in which case it must be modulated by the above-mentioned light modulator, for example in an on-off manner. The only provision is that the sweeping or scanning of the screen 2 is sufficiently rapid to ensure that the persistence of the luminous impression gives observers an impression of continuity.

Figure 5:
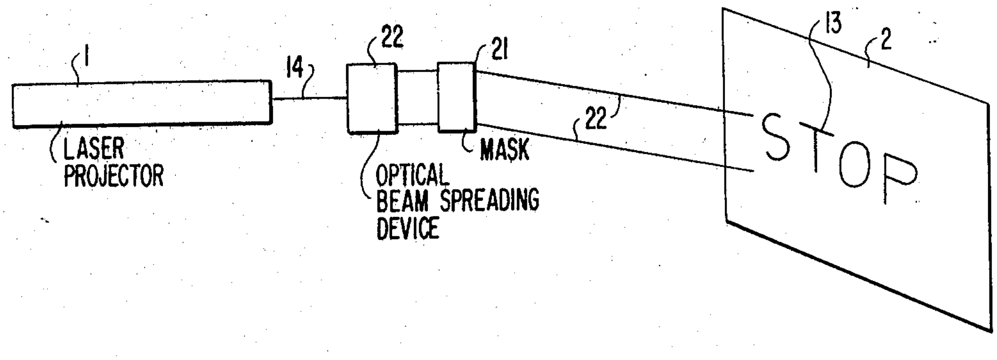
FIG. 5 is a diagrammatic illustration of a second embodiment of an illuminated display apparatus according to the present invention.

As shown in FIG. 5, the deflection system 11 (FIG. 1) can be replaced by an arrangement of an optical beam spreading device 20 for spreading the beam 14 emitted by the laser projector 1, followed by a mask 21, the shadow of which is projected onto the screen 2 via the spread beam 22, either as a positive or a negative image depending on whether the mask 21 has its intelligible characters formed as apertures therein or as opaque portions thereof.

Figure 4:
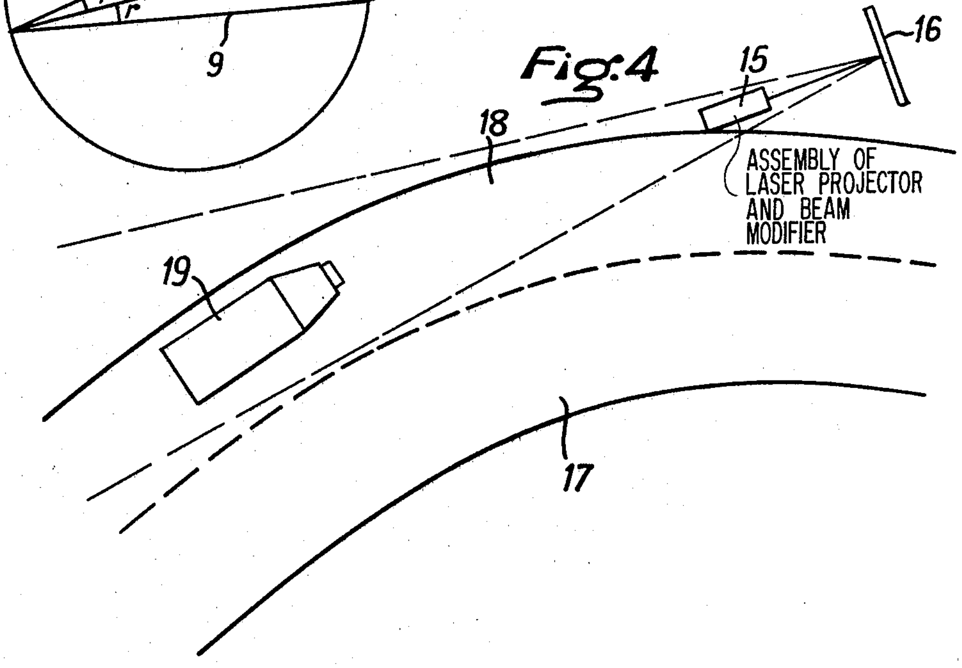
FIG. 4 illustrates an application of the present invention to a roadway.

FIG. 4 shows an apparatus according to the present invention applied to road signalling. The assembly constituted by the laser projector plus, if desired, a beam modifying device which may be means for deflecting, or deflecting and modulating, or spreading and masking the beam, is shown at 15 and the retro-reflective screen is shown at 16. The assembly constituted by the members 15 and 16 is placed at the edge of a road 17 or on a gantry straddling the road 17. The inscriptions on the screen 16 are visible even in full daylight, as stated above. In addition, the small, spreading aperture of the reflected beam 18 from the screen 16 enables the assembly to be so arranged that only vehicles, such as a vehicle 19, arriving in a predetermined zone of the road, receive the displayed message. Vehicles which do not pass into this zone are thus not affected nor distracted by the message displaced on the screen 16.

It is to be understood that the invention is not limited to the various embodiments described above and shown in the drawing by way of example. On the contrary, the invention includes within its scope numerous variants and other embodiments, its scope being defined by the appended claims.

What is claimed is:

1. An illuminated display apparatus comprising a roadway a retro-reflective screen means positioned near said roadway and visible from said roadway, at least one laser projector means for emitting at least one coherent light beam towards said retro-reflective screen means, and means interposed between said laser projector means and said retro-reflective screen means for acting upon the at least one coherent light beam to produce an intelligible display on said retro-reflective screen means.

2. An apparatus according to claim 1, wherein said screen comprises a layer of glass balls.

3. An apparatus according to claim 1, wherein said means for acting upon said at least one coherent light beam comprises beam deflection means for sweeping the said at least one coherent light beam over at least a part of said retro-reflective screen.

4. An apparatus according to claim 3, wherein said screen comprises a layer of glass balls.

5. An apparatus according to claim 3, wherein said means for acting upon said at least one coherent light beam comprises additionally means for modulating the intensity of said at least one coherent light beam.

6. An apparatus according to claim 5, wherein said screen comprises a layer of glass balls.

7. An apparatus according to claim 1, wherein said means for acting upon the light beam comprises means for spreading said at least one coherent light beam, and mask means, the shadow of which is projected onto said retro-reflective screen.

8. An apparatus according to claim 7, wherein said screen comprises a layer of glass balls.

* * * * *